(12) United States Patent
Lin et al.

(10) Patent No.: US 7,126,499 B2
(45) Date of Patent: Oct. 24, 2006

(54) KEYBOARD

(75) Inventors: Chih-Nan Lin, Yunlin (TW); Chih-Hsiang Chiang, Taoyuan (TW); Ling-Hsi Chao, Taoyuan (TW)

(73) Assignee: Darfon Electronics Corp., Taoyuan (TW)

( * ) Notice: Subject to any disclaimer, the term of this patent is extended or adjusted under 35 U.S.C. 154(b) by 222 days.

(21) Appl. No.: 10/856,295

(22) Filed: May 28, 2004

(65) Prior Publication Data

US 2004/0257247 A1 Dec. 23, 2004

(30) Foreign Application Priority Data

Jun. 17, 2003 (TW) ............................... 92116725 A

(51) Int. Cl.
 *H03M 13/00* (2006.01)
(52) U.S. Cl. ......................................... 341/22; 341/176

(58) Field of Classification Search ................... 341/22, 341/20, 26; 345/168
See application file for complete search history.

(56) References Cited

U.S. PATENT DOCUMENTS

| 6,556,186 B1 * | 4/2003 | Narusawa et al. | 345/168 |
| 6,714,143 B1 * | 3/2004 | Ideura | 341/23 |
| 6,861,961 B1 * | 3/2005 | Sandbach et al. | 341/22 |

* cited by examiner

*Primary Examiner*—Michael Horabik
*Assistant Examiner*—Hung Q Dang
(74) *Attorney, Agent, or Firm*—Quintero Law Office

(57) ABSTRACT

A keyboard. The keyboard comprises at least one key, a base, a membrane assembly and a circuit board. The membrane assembly is disposed between the base and the key. At least part of the circuit board is disposed in the key. The keyboard is connected to a notebook computer or a personal computer via a connection member.

10 Claims, 3 Drawing Sheets

KEYBOARD

BACKGROUND OF THE INVENTION

1. Field of the Invention

The present invention relates to a keyboard, and in particular to a keyboard detachably disposed on a notebook computer.

2. Description of the Related Art

A conventional notebook computer includes a keyboard inseparably disposed on a main body. A decoding circuit for decoding signals from keys of the keyboard is generally not disposed thereon, but in the main body of the notebook computer. Nor does the keyboard include a signal connection device for external electronic devices. Also, the keyboard does not include a conversion circuit for the signals from the keys into specific signals for the signal connection device to connect the external electronic devices. The keyboard thus has a single use.

Another conventional notebook computer includes a detachable keyboard assembly with a keyboard circuit and signal connection device. The keyboard circuit decodes signals from the keys of the keyboard for conversion into specific signals for the signal connection device to connect external electronic devices. The keyboard circuit is disposed in an expansion module (such as a base or an expansion box). The expansion module is connected to a keyboard to enable the detachable keyboard assembly. In addition to use in the notebook computer, the detachable keyboard assembly can connect to other electronic devices through a connection member. The detachable keyboard assembly thus has multiple uses. Moreover, Taiwan patent No. 507900 discloses the aforementioned detachable keyboard assembly.

The detachable keyboard assembly, however, is limited by the expansion module receiving the keyboard circuit. The expansion module increases the volume of the detachable keyboard assembly, causing difficulty in deployment of the detachable keyboard assembly in the notebook computer.

Thus, there is a need to provide a detachable keyboard with reduced volume.

SUMMARY OF THE INVENTION

Accordingly, the invention provides a keyboard comprising a first key, a second key, a membrane assembly and a circuit board. The membrane assembly is disposed under the first and second keys to output a first signal from the first key. At least part of the circuit board is disposed in the second key. The circuit board converts the first signal to a second signal.

The second key is a dummy key or a space key.

The keyboard further comprises a flexible printed circuit. The circuit board is a printed circuit board electrically connected to the membrane assembly via the flexible printed circuit.

The circuit board is a flexible printed circuit electrically connected to the membrane assembly.

The invention also provides a keyboard comprising a plurality of keys, a base, a membrane assembly and a circuit board. The base has a hole formed thereon. The membrane assembly is disposed between the base and the keys. At least part of the circuit board is disposed in the hole.

The keyboard further comprises a flexible printed circuit. The circuit board is a printed circuit board electrically connected to the membrane assembly via the flexible printed circuit.

The circuit board is a flexible printed circuit electrically connected to the membrane assembly.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

First Embodiment

Figure 1:
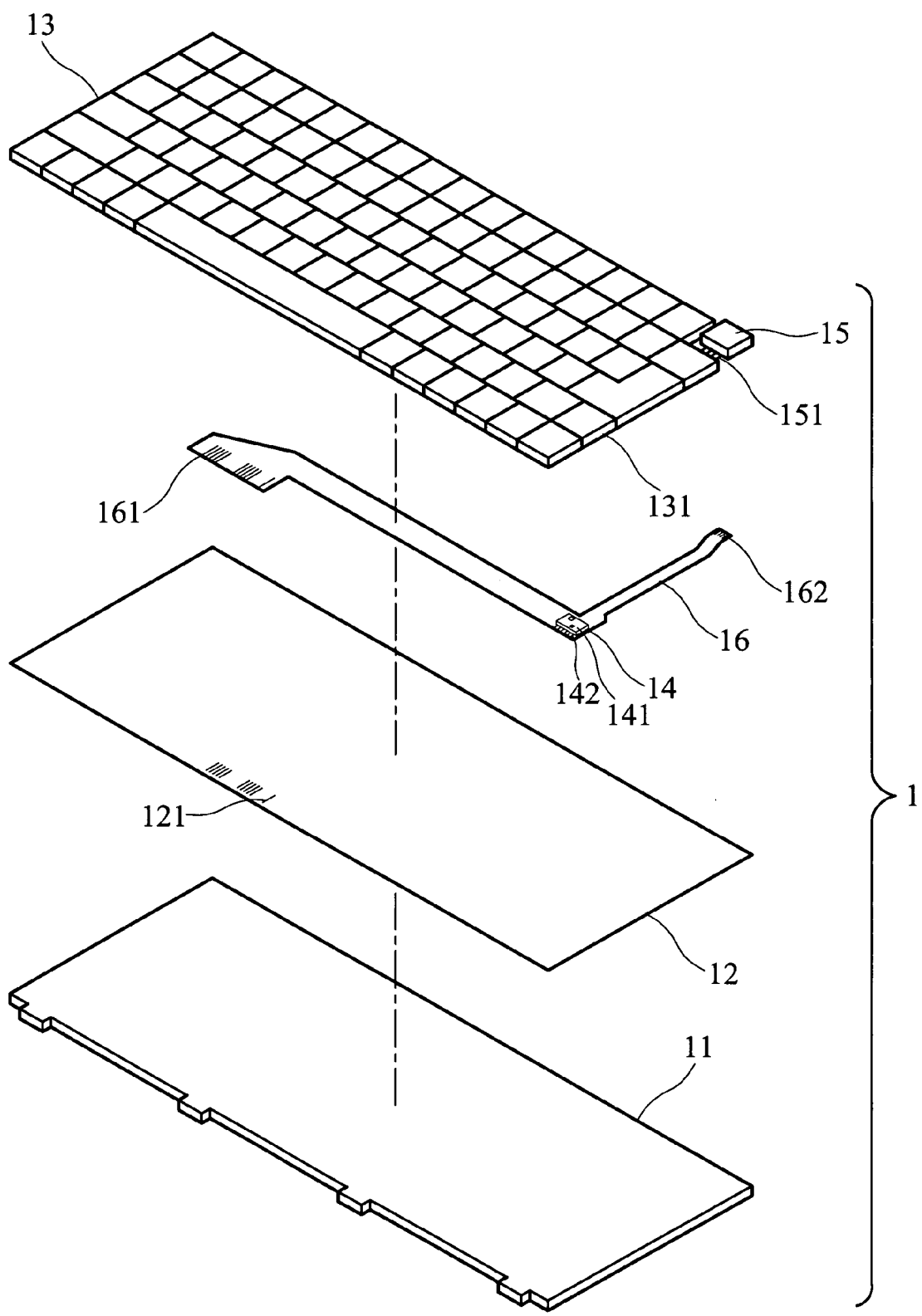
FIG. 1 is an exploded perspective view of the keyboard of a first embodiment of the invention.

Referring to FIG. 1, the keyboard 1 comprises a base 11, a membrane assembly 12, a printed circuit board (PCB) 14 and a plurality of keys 13. The membrane assembly 12 is disposed on the base 11 and comprises an upper film (not shown), an intermediate film (not shown) and a lower film (not shown). The upper and lower films are respectively printed with circuits opposite each other. The intermediate film is not printed with any circuit and separates the upper film from the lower film. Specifically, the intermediate film separates the circuit on the upper film from that on the lower film. The keys 13 are disposed on the membrane assembly 12 and comprise multiple input keys and at least one dummy key 131. The input keys can be pressed to generate corresponding signals. The interior of the dummy key 131 is hollow and the dummy key 131 cannot be pressed to output any signal. When one of the input keys is pressed, the upper and lower films corresponding to the position of this input key contact each other and are electrically conducted, outputting a signal to a keyboard circuit 141 deployed on the printed circuit board 14. In this embodiment, the printed circuit board 14 (keyboard circuit 141) is disposed (inlaid) in the hollow inside of the dummy key 131 such that the keyboard circuit 141 does not increase the thickness of the keyboard 1. A contact terminal 142 is welded on the printed circuit board 14. The keyboard circuit 141 is electrically connected to the printed circuit board 14 via the contact terminal 142. The printed circuit board 14 is connected to a flexible printed circuit 16 deployed with a first connection terminal 161 and a second connection terminal 162. The first connection terminal 161 of the flexible printed circuit 16 is connected to a third connection terminal 121 of the membrane assembly 12 by thermal pressing, such that the flexible printed circuit 16 is electrically connected to the membrane assembly 12. The second connection terminal 162 of the flexible printed circuit 16 is electrically connected to a contact terminal 151 of a signal connection device 15 by welding. The signal connection device 15 is in a corresponding position among the keys 13. Namely, the signal connection device 15 and keys 13 have the same height and are located on the same plane. The keyboard circuit 141 can include a keyboard signal decoding chip, a controlling chip for the signal connection device 15 and passive components. When one of the input keys is pressed to contact the membrane assembly 12, the membrane assembly 12 generates a first signal corresponding to the input key. The first signal is transmitted to the keyboard circuit 141 and is thereby decoded and converted to a specific signal (second signal) for the signal connection device 15. The specific signal (second signal) can be output to an external electronic device via the signal connection device 15. The keyboard 1 is thus electrically connected to the external electronic device.

Accordingly, since the printed circuit board 14 and keyboard circuit 141 thereon are inlaid in the hollow interior of the dummy key 131 and the flexible printed circuit 16 is extremely thin, the thickness of the keyboard 1 is not notably increased, maintaining volume.

Second Embodiment

Figure 2:
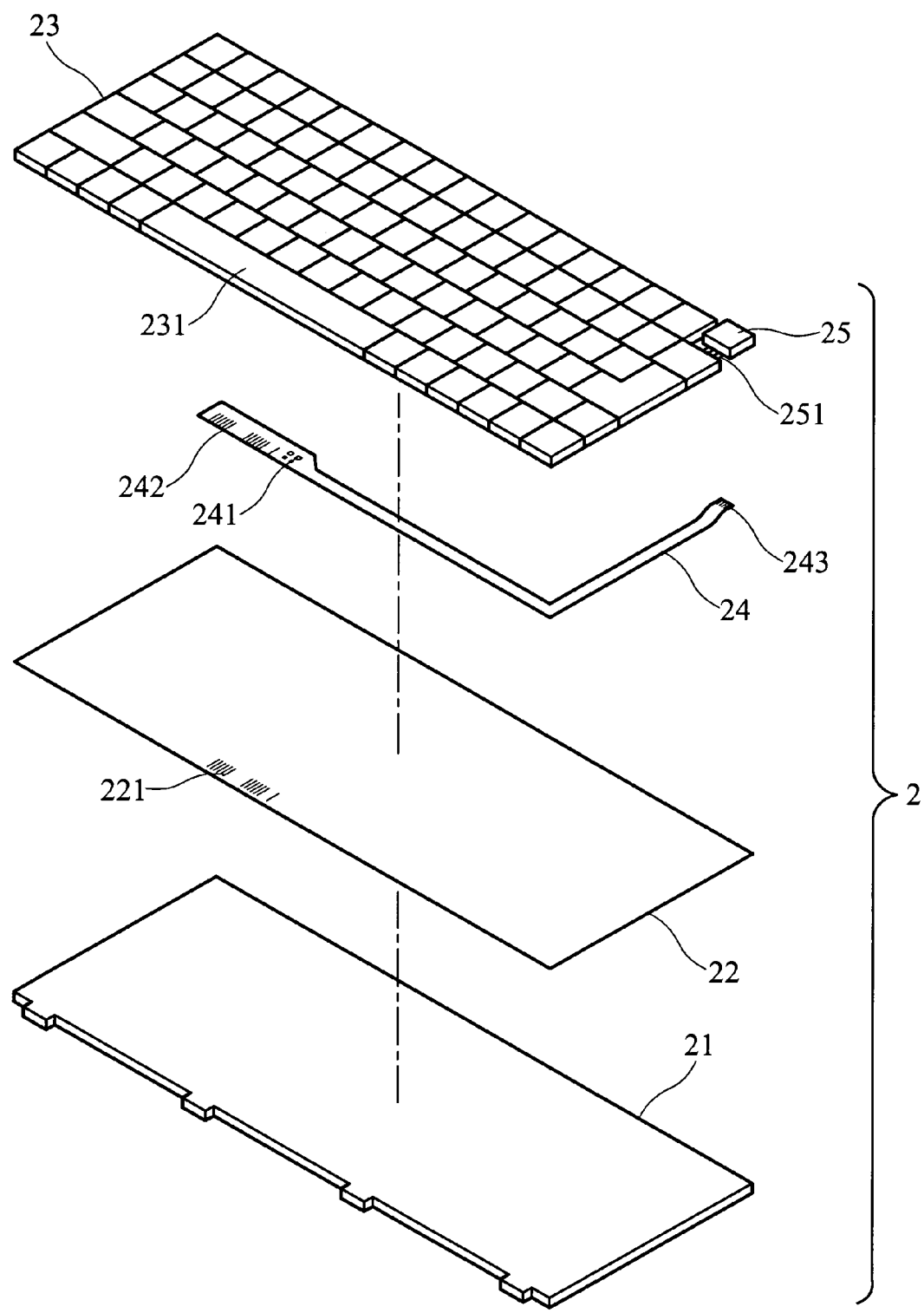
FIG. 2 is an exploded perspective view of the keyboard of a second embodiment of the invention.

Referring to FIG. 2, the keyboard 2 comprises a base 21, a membrane assembly 22, a flexible printed circuit (FPC) 24 and a plurality of keys 23. The membrane assembly 22 is disposed on the base 21 and comprises an upper film (not shown), an intermediate film (not shown) and a lower film (not shown). The upper and lower films are respectively printed with circuits opposite each other. The intermediate film is not printed with any circuit and separates the upper film from the lower film. Specifically, the intermediate film separates the circuit on the upper film from that on the lower film. The keys 23 are disposed on the membrane assembly 22 and comprise multiple input keys. Specifically, a space key 231 of the input keys has a large hollow interior. The input keys can be pressed to generate corresponding signals. When one of the input keys is pressed, the upper and lower films corresponding to the position of this input key contact each other and are electrically conducted, outputting a signal to a keyboard circuit 241 deployed on the flexible printed circuit 24. The keyboard circuit 241 includes chips, passive components and wires. In this embodiment, the keyboard circuit 241 is disposed (inlaid) in the hollow interior of the space key 231 such that the keyboard circuit 241 does not increase the thickness of the keyboard 2. The chips and passive components of the keyboard circuit 241 are attached to the flexible printed circuit 24 by anisotropic conductive film (ACF) and thermal pressing. Additionally, the wires of the keyboard circuit 241 are laid on the flexible printed circuit 24. The flexible printed circuit 24 has a first connection terminal 242 and a second connection terminal 243. The first connection terminal 242 of the flexible printed circuit 24 is connected to a third connection terminal 221 of the membrane assembly 22 by thermal pressing, such that the flexible printed circuit 24 is electrically connected to the membrane assembly 22. The second connection terminal 243 of the flexible printed circuit 24 is electrically connected to a contact terminal 251 of a signal connection device 25 by anisotropic conductive film (ACF) and thermal pressing The signal connection device 25 is in a corresponding position among the keys 23. Namely, the signal connection device 25 and keys 23 have the same height and are located on the same plane. Additionally, the chips of the keyboard circuit 241 can include a keyboard signal decoding chip and a controlling chip for the signal connection device 25. When one of the input keys is pressed to contact the membrane assembly 22, the membrane assembly 22 generates a first signal corresponding to the input key. The first signal is transmitted to the keyboard circuit 241 and is thereby decoded and converted to a specific signal (second signal) for the signal connection device 25. The specific signal (second signal) can be output to an external electronic device via the signal connection device 25. The keyboard 2 is thus electrically connected to the external electronic device.

Accordingly, since the chips and passive components of the keyboard circuit 241 are inlaid in the hollow interior of the space key 231 and the flexible printed circuit 24 is extremely thin, the thickness of the keyboard 2 is not notably increased, maintaining volume.

Third Embodiment

Figure 3:
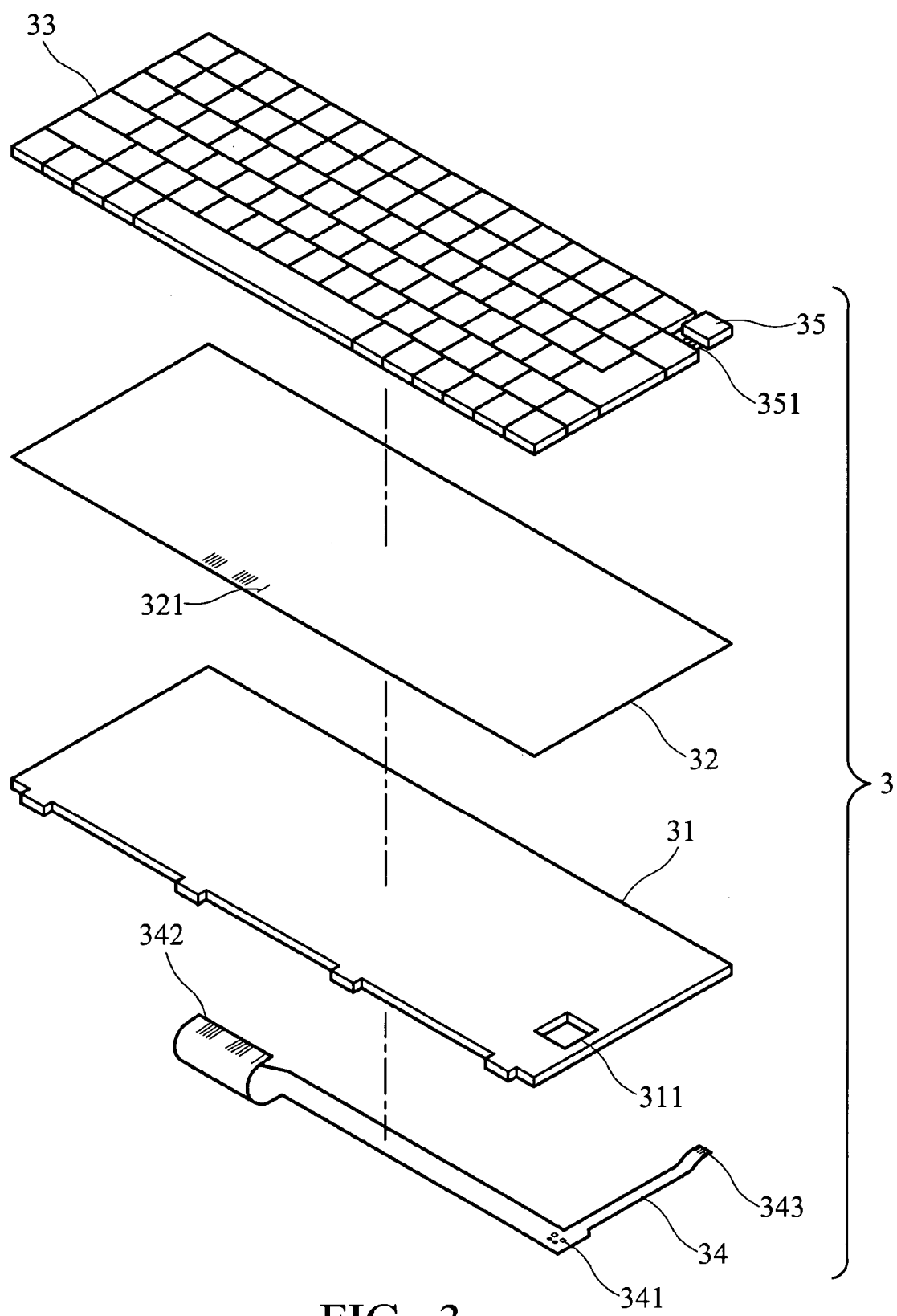
FIG. 3 is an exploded perspective view of the keyboard of a third embodiment of the invention.

Referring to FIG. 3, the keyboard 3 comprises a base 31, a membrane assembly 32, a flexible printed circuit (FPC) 34 and a plurality of keys 33. The base 31 is formed with a through hole 311. The membrane assembly 32 is disposed on the base 31 and comprises an upper film (not shown), an intermediate film (not shown) and a lower film (not shown). The upper and lower films are respectively printed with circuits opposite each other. The intermediate film is not printed with any circuit and separates the upper film from the lower film. Specifically, the intermediate film separates the circuit on the upper film from that on the lower film. The keys 33 are disposed on the membrane assembly 32 and comprise multiple input keys. The input keys can be pressed to generate corresponding signals. When one of the input keys is pressed, the upper and lower films corresponding to the position of this input key contact each other and are electrically conducted, outputting a signal to a keyboard circuit 341 deployed on the flexible printed circuit 34. The keyboard circuit 341 includes chips, passive components and wires. In this embodiment, the keyboard circuit 341 is disposed in the through hole 311 of the base 31 such that the keyboard circuit 341 does not increase the thickness of the keyboard 3. The chips and passive components of the keyboard circuit 341 are attached to the flexible printed circuit 34 disposed under the base 31 by anisotropic conductive film (ACF) and thermal pressing. Additionally, the wires of the keyboard circuit 341 are laid on the flexible printed circuit 34. The flexible printed circuit 34 has a first connection terminal 342 and a second connection terminal 343. The first connection terminal 342 of the flexible printed circuit 34 extends upwardly and across the outer edge of the base 31 to connect a third connection terminal 321 of the membrane assembly 32 by thermal pressing, such that the flexible printed circuit 34 is electrically connected to the membrane assembly 32. The second connection terminal 343 of the flexible printed circuit 34 extends upwardly and across the outer edges of the base 31 and membrane assembly 32 to electrically connect a contact terminal 351 of a signal connection device 35 by anisotropic conductive film (ACF) and thermal pressing. The signal connection device 35 is in a corresponding position among the keys 33. Namely, the signal connection device 35 and keys 33 have the same height and are located on the same plane. Additionally, the chips of the keyboard circuit 341 can include a keyboard signal decoding chip and a controlling chip for the signal connection device 35. When one of the input keys is pressed to contact the membrane assembly 32, the membrane assembly 32 generates a first signal corresponding to the input key. The first signal is transmitted to the keyboard circuit 341 and is thereby decoded and converted to a specific signal (second signal) for the signal connection device 35. The specific signal (second signal) can be output to an external electronic device via the signal connection device 35. The keyboard 3 is thus electrically connected to the external electronic device.

Accordingly, since the chips and passive components of the keyboard circuit 341 are disposed in the through hole 311 of the base 31 and the flexible printed circuit 34 is very thin, the thickness of the keyboard 3 is not notably increased, maintaining volume.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A keyboard, comprising:
   at least one key;
   a base;
   a membrane assembly disposed between the base and the key to output a corresponding signal from the key; and
   a circuit board connected to the membrane assembly and disposed in the key.

2. The keyboard as claimed in claim 1, wherein the key comprises a dummy key.

3. The keyboard as claimed in claim 1, wherein the key comprises a space key.

4. The keyboard as claimed in claim 1, further comprising a flexible printed circuit, wherein the circuit board is a printed circuit board and is electrically connected to the membrane assembly via the flexible printed circuit.

5. The keyboard as claimed in claim 1, wherein the circuit board is a flexible printed circuit and is electrically connected to the membrane assembly.

6. A keyboard, comprising:
   a first key;
   a second key;
   a membrane assembly disposed under the first and second keys to output a first signal from the first key; and
   a circuit board connected to the membrane assembly and disposed in the second key, wherein the circuit board converts the first signal to a second signal.

7. The keyboard as claimed in claim 6, wherein the second key comprises a dummy key.

8. The keyboard as claimed in claim 6, wherein the second key comprises a space key.

9. The keyboard as claimed in claim 6, further comprising a flexible printed circuit, wherein the circuit board is a printed circuit board and is electrically connected to the membrane assembly via the flexible printed circuit.

10. The keyboard as claimed in claim 6, wherein the circuit board is a flexible printed circuit and is electrically connected to the membrane assembly.

* * * * *